United States Patent [19]

Chen

[11] 3,890,315

[45] June 17, 1975

[54] METHOD FOR PREPARING N-SUBSTITUTED MORPHOLINES

[75] Inventor: Ting P. Chen, Wappingers Falls, N.Y.

[73] Assignee: Texaco Inc., New York, N.Y.

[22] Filed: June 14, 1972

[21] Appl. No.: 262,918

[52] U.S. Cl..... 260/247; 260/247.5 R; 260/247.7 Y
[51] Int. Cl. ...................... C07d 87/26; C07d 87/24
[58] Field of Search....... 260/247, 247.7 A, 247.5 R

[56] References Cited
UNITED STATES PATENTS
3,641,022  2/1972  Chisholm et al.................. 260/247

*Primary Examiner*—Donald G. Daus
*Assistant Examiner*—Jose Tovar
*Attorney, Agent, or Firm*—T. H. Whaley; C. G. Ries; J. J. O'Loughlin

[57] ABSTRACT

Liquid phase method for preparing an N-substituted morpholine comprising contacting hydrocarbon solution of an N-substituted bis-(2-hydroxyethyl) amine with alumina while maintaining the reaction mixture at a temperature in the range of 340° to 425° C.

8 Claims, No Drawings

METHOD FOR PREPARING N-SUBSTITUTED MORPHOLINES

BACKGROUND OF THE INVENTION

1. Field of the Invention

Methods for preparing N-substituted morpholines involving dehydration of an N-substituted bis-(2-hydroxyethyl) amine in contact with a dehydration catalyst are known. Mineral acids are highly effective for promoting this reaction but they have the drawback of causing the formation of undesirable by-products which complicates the recovery of the desired N-substituted morpholines and reduces the yield that could be expected.

Another method which is effective for preparing N-substituted morpholines involves vaporization of the N-substituted bis-(2-hydroxyethyl) amine precursor at an elevated temperature under reduced pressure while contacting the precursor with a dehydration catalyst. This process is difficult to control and can lead to the production of excessive amounts of decomposition products along with the production of the desired product.

2. Description of the Prior Art

U.S. Pat. No. 2,597,260 discloses a vapor phase method for preparing N-aliphatic morpholines which comprises contacting a bis-(2-hydroxyethyl) aliphatic hydrocarbon amine with a dehydration catalyst while the amine is maintained in the vapor phase at a temperature from 300° to 400°C.

SUMMARY OF THE INVENTION

A liquid phase method for preparing N-substituted morpholines is provided comprising reacting an inert liquid hydrocarbon solution of an N-substituted bis-(hydroxyethyl) amine in the presence of an aluminum oxide catalyst while maintaining the reaction mixture at a temperature in the range from about 340° to 425°C under essentially atmospheric pressure to effect cyclization and recovering the N-substituted morpholine. This method is particularly suitable for preparing high molecular weight N-substituted morpholine derivatives where the prior art vapor phase method would be unsatisfactory.

DESCRIPTION OF THE PREFERRED EMBODIMENTS

In accordance with the present method, an N-substituted morpholine is prepared by reacting an N-substituted bis-(hydroxyethyl) amine in the liquid phase and in contact with an aluminum oxide catalyst at a temperature in the range of 340° to 425°C in order to effect dehydration or cyclization and formation of the N-substituted morpholine. The N-substituted bis-(hydroxyethyl)amine starting material is represented by the formula:

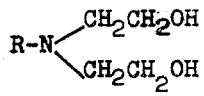

in which R is a hydrocarbyl radical or a substituted hydrocarbyl radical having oxy-, hydroxy, or amine functional groups and having from 10 to about 30 carbon atoms in the hydrocarbyl or the substituted hydrocarbyl radical. R will generally represent an aliphatic hydrocarbon radical such as decyl, dodecyl, tetradecyl, octadecyl and higher aliphatic hydrocarbon radicals. R can also represent cycloaliphatic radicals, aromatic radicals and mixed alkaryl and aralkyl radicals. Typical substituted hydrocarbyl radicals represented by R include hydroxyalkyl, aminoalkyl, hydroxyalkylaminoalkyl, alkoxyalkyl and similar radicals. The preferred N-substituted bis-(hydroxyethyl) amines for the reaction are those in which R represents an aliphatic hydrocarbon radical containing from about 12 to about 18 carbon atoms.

The liquid phase preparation of N-substituted morpholine by the present process is facilitated by dissolving the N-substituted bis-(hydroxyethyl) amine precursor in an inert liquid hydrocarbon. Any hydrocarbon which is inert to the reaction and which remains liquid under the conditions of the reaction can be employed as a carrier liquid for the N-substituted bis-(hydroxyethyl) amine described aove. Suitable liquid hydrocarbons carriers or solvents include toluene, benzene, and xylene, the aromatic type solvent being particularly suitable. The concentration of the N-substituted bis-(hydroxyethyl) amine in the hydrocarbon solution is not considered critical. Highly effective conversions have been realized employing from about 30 to about 50 percent solutions of the N-hydrocarbyl bis-(hydroxyethyl) amine in toluene. It will be appreciated that very dilute solutions of the precursor as well as more concentrated solutions which are fluid under the conditions of the reaction can be employed.

The reaction temperature employed in this process for the production of morpholines having N-substituted groups with 10 to 30 carbon atoms is critical. The minimum temperature for effecting this reaction is 340°C ranging up to about 425°C. The reaction can be conducted at higher temperatures provided that the temperature does not exceed the decomposition temperature of the precursor material or of the product. In general, the preferred temperature range for the reaction is from about 340° to 390°C.

This method involves contacting the solution of the prescribed N-substituted bis-(hydroxyethyl) amine with alumina or aluminum oxide under the foregoing temperatures and under essentially atmospheric pressure to effect the dehydration or cyclization to the N-substituted morpholine. It is convenient to employ the alumina dehydration catalyst in the form of pellets or small particles in order to provide a relatively large surface for effecting the reaction. The use of alumina as the catalyst is critical in the present method. Alumina is an essentially neutral catalyst and under the conditions of this reaction it promotes a relatively high conversion to N-substituted morpholine without causing any material production of by-products.

The method is advantageously conducted by passing the liquid reaction mixtue downwardly through a packed column of alumina under the prescribed conditions. It is advantageous at times to employ a moderate inert gas pressure on the reaction mixture in the column in order to control the throughput. In such a case, nitrogen is the preferred gas.

N-substituted morpholines which can be prepared by the present process can be represented by the following general formula:

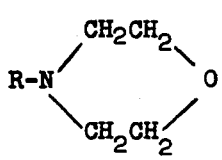

in which R represents a hydrocarbyl radical or a substituted hydrocarbyl radical having oxy-, hydroxy or amine functional groups or a mixture of these functional groups and having from 10 to 30 carbon atoms. Specific compounds which can be prepared by this process include N-decyl morpholine, N-dodecyl morpholine, N-octadecyl morpholine, N-ethoxy-tetradecyl morpholine, N-tetracosyl morpholine, N-12-aminododecyl morpholine, and N-12-hydroxy-tetradecyl morpholine.

The following example illustrates the preparation of N-substituted morpholine according to the practice of this invention.

A quartz reaction column was prepared containing 50 grams of alumina pellets with Raschig rings at both ends of the column. The reactor was heated to 340°C under a stream of nitrogen. A solution of 87 grams of ($C_{10}$-$C_{14}$ secondary alkyl)-bis (2-hydroxyethyl) amine in 50 milliters of toluene was prepared. The liquid reaction mixture was introduced into the quartz column under a slight nitrogen pressure while the reactor was maintained at a temperature from 340° to 360°C. The reaction product was collected in a receiving vessel and cooled in an ice bath. The yield of crude product was about 90%.

The crude product was fractionated and the material was analyzed. IR and NMR indicated that N-$C_{10}$-$C_{14}$ secondary alkyl morpholine was obtained. This finding was supported by the analytical findings:

| Theoretical: | | Found: | | |
|---|---|---|---|---|
| %C | 75.29 | %C | 75.5 | |
| %H | 12.94 | %H | 13.0 | |
| %N | 5.49 | %N | 5.4 | |
| %O | 6.28 | %O | 6.1 | (by difference) |
| Mol Wgt. | 255 | Mol. Wgt. | 251 | |

The liquid phase process of the invention is highly effective for producing relatively pure high molecular weight N-substituted morpholines. The method is relatively easy to control and avoids the production of substantial amounts of undesirable byproducts.

I claim:

1. A liquid phase method for preparing an N-substituted morpholine which comprises the steps of forming a hydrocarbon solution of an N-substituted bis-(hydroxyethyl) amine represented by the formula:

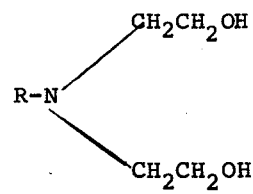

in which R is alkyl having from 10 to 30 carbon atoms, and passing said solution through a column packed with an alumina catalyst while maintaining a reaction temperature in the range of 340° to 425°C. to effect cyclization and recovering an N-substituted morpholine.

2. A method according to claim 1 in which said reaction is conducted at a temperature from about 340° to 390°C.

3. A method according to claim 1 in which said solution consists of about 25 to 50% of said N-substituted bis-(hydroxyethyl) amine.

4. A method according to claim 1 in which said liquid hydrocarbon is an inert aromatic hydrocarbon.

5. A method according to claim 1 in which said reaction is conducted at essentially atmospheric pressure.

6. A method according to claim 1 in which said reaction is conducted under a positive pressure from an inert gas.

7. A method according to claim 1 in which said reaction is conducted under nitrogen pressure.

8. A method according to claim 1 in which R is alkyl having from 12 to 18 carbon atoms.

* * * * *